United States Patent
Dron et al.

(10) Patent No.: US 7,566,029 B2
(45) Date of Patent: Jul. 28, 2009

(54) SUSPENSION FOR SUSPENDING A JET ENGINE ON AN AIRCRAFT STRUT

(75) Inventors: Sebastien Dron, Montrouge (FR); Thibaut Guibert, Paris (FR); Gregory Prudhomme, Le Havre (FR); Marc Patrick Tesniere, Champcueil (FR)

(73) Assignee: SNECMA, Paris (FR)

( * ) Notice: Subject to any disclaimer, the term of this patent is extended or adjusted under 35 U.S.C. 154(b) by 289 days.

(21) Appl. No.: 11/389,260

(22) Filed: Mar. 27, 2006

(65) Prior Publication Data

US 2006/0219841 A1    Oct. 5, 2006

(30) Foreign Application Priority Data

Mar. 29, 2005    (FR)    .................................. 05 50803

(51) Int. Cl.
*B64D 27/26*    (2006.01)
*B64D 27/00*    (2006.01)

(52) U.S. Cl. ............................. 244/54; 248/554; 60/796
(58) Field of Classification Search .................. 244/54; 248/554, 555; 60/796–798
See application file for complete search history.

(56) References Cited

U.S. PATENT DOCUMENTS

| | | | | | |
|---|---|---|---|---|---|
| 4,603,822 | A | * | 8/1986 | Chee | 244/54 |
| 4,717,094 | A | * | 1/1988 | Chee | 244/54 |
| 4,725,019 | A | * | 2/1988 | White | 244/54 |
| 5,078,342 | A | * | 1/1992 | Langley et al. | 244/54 |
| 5,277,382 | A | * | 1/1994 | Seelen et al. | 244/54 |
| 5,320,307 | A | * | 6/1994 | Spofford et al. | 244/54 |
| 5,351,930 | A | * | 10/1994 | Gwinn et al. | 24/557 |
| 5,620,154 | A | * | 4/1997 | Hey | 244/54 |
| 5,649,417 | A | * | 7/1997 | Hey | 60/797 |
| 5,725,181 | A | * | 3/1998 | Hey | 244/54 |
| 5,860,623 | A | | 1/1999 | Dunstan et al. | |
| 5,873,547 | A | * | 2/1999 | Dunstan | 244/54 |
| 6,059,227 | A | * | 5/2000 | Le Blaye et al. | 244/54 |
| 6,173,919 | B1 | * | 1/2001 | Le Blaye | 244/54 |
| 6,189,830 | B1 | * | 2/2001 | Schnelz et al. | 244/54 |
| 6,296,203 | B1 | * | 10/2001 | Manteiga et al. | 244/54 |

(Continued)

FOREIGN PATENT DOCUMENTS

EP    0 744 338 A1    11/1996

OTHER PUBLICATIONS

U.S. Appl. No. 11/389,260, filed Mar. 27, 2006, Dron, et al.

(Continued)

*Primary Examiner*—Michael R Mansen
*Assistant Examiner*—Joseph W Sanderson
(74) *Attorney, Agent, or Firm*—Oblon, Spivak, McClelland, Maier & Neustadt, P.C.

(57) ABSTRACT

A suspension for suspending a jet engine on an aircraft strut includes a beam having a platform provided with fasteners for fastening the beam to the aircraft strut and arranged transversely with respect to a longitudinal axis of the jet engine. The suspension also includes first and second lateral links, the second lateral link being prolonged by a finger housed with clearance in a cavity provided in the beam so as to form a standby safety connection. The suspension further includes a central link. The finger extends between the platform and a pin of the central link in normal operation.

12 Claims, 3 Drawing Sheets

U.S. PATENT DOCUMENTS

| | | | |
|---|---|---|---|
| 6,330,995 B1 * | 12/2001 | Mangeiga et al. | 248/554 |
| 6,341,746 B1 * | 1/2002 | Pascal et al. | 244/54 |
| 6,601,796 B2 * | 8/2003 | Roszak | 244/54 |
| 6,682,015 B2 * | 1/2004 | Levert et al. | 244/54 |
| 6,758,438 B2 * | 7/2004 | Brefort et al. | 244/54 |
| 6,843,449 B1 * | 1/2005 | Manteiga et al. | 244/54 |
| 6,986,482 B2 * | 1/2006 | Brefort et al. | 244/54 |
| 6,988,692 B2 * | 1/2006 | Pasquer et al. | 244/54 |
| 7,021,585 B2 * | 4/2006 | Loewenstein et al. | 244/54 |
| 7,108,224 B2 * | 9/2006 | Pasquer et al. | 244/54 |
| 7,165,743 B2 * | 1/2007 | Pasquer et al. | 244/54 |
| 7,325,770 B2 * | 2/2008 | Chevalier et al. | 244/54 |
| 2005/0269446 A1 * | 12/2005 | Dron | 244/54 |

OTHER PUBLICATIONS

U.S. Appl. No. 12/103,258, filed Apr. 15, 2008, Dron, et al.

* cited by examiner

SUSPENSION FOR SUSPENDING A JET ENGINE ON AN AIRCRAFT STRUT

FIELD OF THE INVENTION

The present invention concerns the field of jet engines and is directed towards the suspension thereof on the structure of the aircraft which they propel.

BACKGROUND OF THE INVENTION

A propulsion engine, such as a jet engine, may be mounted at various points on the aircraft by being attached to a strut or a pylon belonging to the aircraft structure. It may thus be suspended under the wing, fastened to the fuselage, generally at the rear, or mounted in the tail unit using suitable attachment means. The function of these attachment means is to ensure that mechanical forces are transmitted between the engine and the structure of the aircraft. The loads to be taken into consideration are oriented in the three main directions of a reference frame linked with the engine. These are in particular the weight of the engine along the vertical axis Z, its thrust along the axis X of the engine, and the lateral aerodynamic loads along the transverse axis Y. The loads to be transmitted also comprise the torque taken up around the axis of the engine. These means must additionally absorb the deformations experienced by the engine during the various flight phases, resulting, for example, from dimensional variations due to thermal expansions or contractions, without transmitting these deformations to the strut.

The connection between the engine and the strut is generally provided in the case of fan engines by means of two suspension planes, one at the front of the engine at the level of the intermediate casing, the other at the rear. Each of the suspension means is designed to transmit some of the forces. For example, one of the suspensions is responsible for taking up or transferring lateral forces along the axis Y and vertical forces along the axis Z, and also for taking up the engine torque around the axis X. The other suspension is responsible for transmitting the thrust and also the lateral and vertical forces to the aircraft strut. Such a suspension is isostatic.

Generally, a suspension means comprises a beam, if appropriate a double beam, fastened to the strut by means of bolts and connected to the engine casing by means of links. Depending on their mounting, the links pivot at their ends on devises or tabs which are secured to the engine casing and to the beam, respectively. To ensure that the transmission of the forces by the links is purely axial, that is to say along the axis of the links, there is provided a swivel-type bearing for the pins passing through, at each end of the links. This type of mounting makes it possible. in particular to absorb the radial and axial expansions of the engine.

Safety-related constraints also demand the presence of means which overcome the failure of a force-transmitting element. To this end, these suspensions are thus generally provided with connecting means having a clearance, known as standby means, which become active by absorbing the clearance and transmit the forces via a safety path if one of the transmissions becomes defective following the breaking of a piece.

U.S. Pat. No. 5,860,623 discloses a rear suspension for suspending a jet engine on an aircraft strut, comprising a beam running transversely with respect to the axis of the engine and connected by three links to the engine casing. The beam comprises a platform having means for fastening it to the strut by bolting. It is distinguished by first and second lateral links each connected by a first pin to the beam and by a second pin to a fitting secured to the engine casing. These links are arranged on either side of the axis of the engine. A central link is arranged between the two lateral links and is likewise connected by a first pin to the beam and by a second pin to the fitting. In normal operation, the function of these three links is to transmit the vertically and laterally oriented forces and also the engine torque to the strut.

One of the two lateral links comprises a finger which prolongs it in the region of the first pin. This finger is housed with clearance in an orifice provided in a rib of the beam. This rib is perpendicular to the plane of rotation of the link and the clearance is sufficient for the movements of the link not to be blocked in normal operation. The mounting is isostatic. Should a breakage occur in a connection of the first link or of the central link, the clearance is eliminated by the engine tilting around the axes of the other two links, and the connection remains isostatic. The other links assume the transfer of all the forces on this suspension.

There is a second connection, a standby safety connection, between the central link and the engine casing in the form of a connecting pin which passes both through the central link and through a clevis secured to the engine casing. This pin is mounted with a clearance on either the link or the clevis. This clearance is eliminated in the same way as above when one of the other connections becomes broken, and the forces are then transferred via the remaining connections.

The objective set by the Applicant is to produce a suspension which performs the same functions as those featured in the above patent but which is simpler to manufacture while at the same time satisfying the strength and reliability constraints.

SUMMARY OF THE INVENTION

According to the invention, the suspension for suspending a jet engine on an aircraft strut, comprising a beam having a platform provided with means for fastening it to the said strut and arranged transversely with respect to the axis of the engine, first and second lateral links each connected by a first pin to the beam and by a second pin to the engine casing, the second lateral link being prolonged in the region of the first pin by a finger housed with clearance in a cavity provided in the beam so as to form a standby safety connection, and a central link arranged between the two lateral links and connected by a first pin to the beam and by a second pin to the said casing, is characterized in that the beam comprises a clevis for housing the first connecting pin of the central link, and the said first pin is distant from the platform so that a space is provided between the platform and the central link, this space forming the said cavity in which the finger of the second lateral link is housed with clearance in normal operation.

The invention has the advantage of avoiding the incorporation of a specific rib and the machining thereof to produce the housing for the standby connection. This solution is advantageous in terms of cost but also in terms of weight.

According to another feature, the central link is connected by a third pin to the beam so as to form a standby connection. This standby connection becomes active when, in particular, the first connecting pin of this central link is broken. In that case, the suspension can remain isostatic.

According to another feature, the clevises supporting the first connecting pins of the two lateral links and of the central link together form a piece of U-shaped cross section with the platform. The solution of the invention thus makes it possible to produce a beam whose simplified geometry allows economic manufacture by machining.

BRIEF DESCRIPTION OF THE DRAWINGS

A more detailed description will now be given of the invention with reference to the appended drawings, which show a non-limiting embodiment and in which.

DETAILED DESCRIPTION OF THE DRAWINGS

Figure 1:
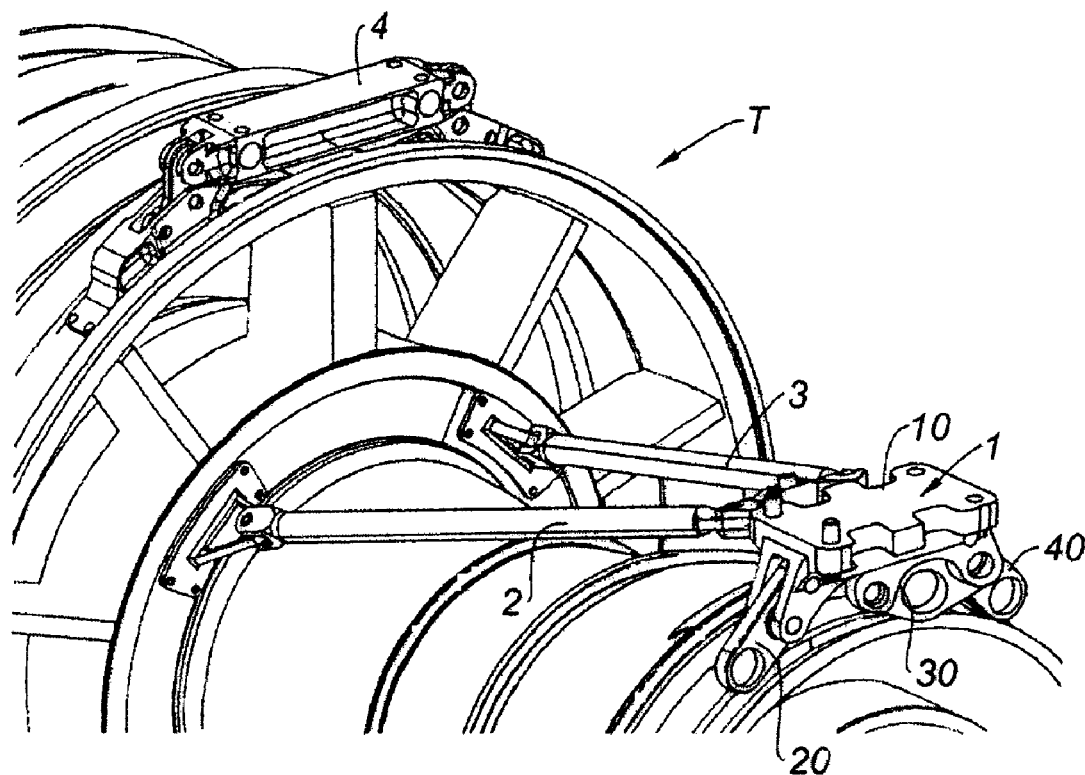
FIG. 1 is a schematic representation of the suspension for suspending a jet engine on an aircraft.

FIG. 1 is a rear three-quarter view showing a jet engine T equipped with its means of attachment to an aircraft strut (not shown). The engine may in particular be attached to the wing of an aircraft. According to this suspension route, the engine comprises an attachment device 4 at the front of the engine, which is fastened to the intermediate fan casing. It also includes an attachment means 1 at the rear, which is fastened to the primary-stream exhaust casing. The thrust is taken up by two bars 2 and 3 which are arranged longitudinally on either side of the axis of the engine and are attached at their ends, on the one hand to the hub of the fan casing and on the other hand to the rear attachment.

Figure 2:
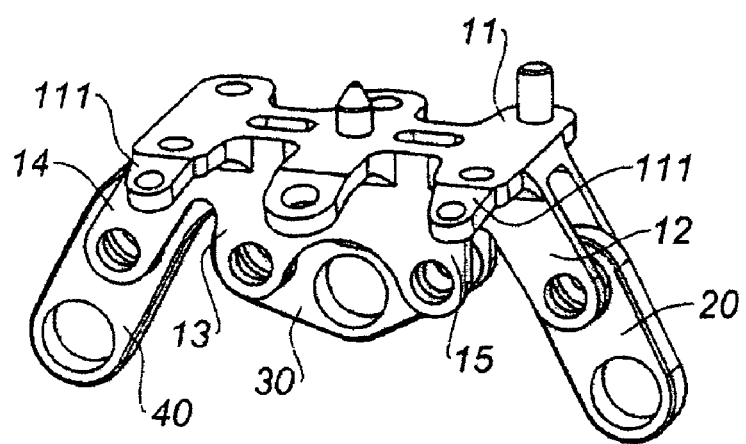
FIG. 2 represents a perspective view of the suspension of the invention, the links being in position but the pins not being represented.
Figure 3:
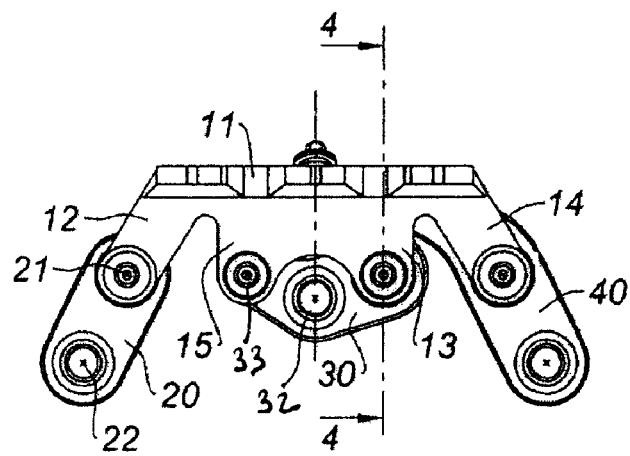
FIG. 3 shows a front view of the suspension.

The description which follows concerns the rear attachment 1. As can be seen from FIGS. 2 and 3, the attachment comprises a beam 10 for fastening to the strut or pylon of the aircraft, and three links 20, 30, 40 connecting the beam 10 to the devises which are secured to the engine casing. These devises are not represented.

The beam 10 comprises a platform 11 provided with housings for the passage of suitable means for fastening it to the strut, such as bolts. These means are known per se. The beam is arranged perpendicularly to the axis of the engine. Its face directed towards the upstream end of the engine, with respect to the gas-flow direction, comprises tabs 111 for fastening the thrust-transmitting bars 2 and 3. That is also known per se.

The beam 10 is also provided with devises 12, 13, 14 and 15 for housing the pins by means of which the three links 20, 30, 40 are retained and articulated. These devises comprise an upstream lug and a downstream lug with respect to the gas-flow direction. The various upstream lugs are advantageously in one and the same plane, which is perpendicular to the plane of the platform 11. Likewise, the downstream lugs are in one and the same plane, which is parallel to the plane of the upstream lugs. This arrangement enables a beam of relatively simple shape to be produced, since it is composed substantially of three planes: a first plane forming the platform, a second plane forming the upstream lugs, and a third plane forming the downstream lugs. Machining such a piece is simpler than in the embodiments of the prior art.

The first lateral link 20 is articulated on the clevis 12 by being mounted on a first pin 21 which passes through it and also through the two lugs of the clevis 12. The link 20 is articulated by a second connecting pin 22, at its other end, on a clevis (not shown) secured to the engine casing fitting.

The second lateral link 40 is articulated in the same way on the clevis 14 by being mounted on a first connecting pin 41 which passes through it and also through the two lugs of the clevis 14. The link is articulated at its other end by a second connecting pin 42 on a clevis (not shown) which is secured to the engine casing fitting.

The third link, referred to as the central link 30, is arranged between the two lateral links in one and the same transverse plane as the latter two. This link 30 is articulated in the same way on the clevis 13 by being mounted on a first pin 31 which passes through it and also through the two lugs of the clevis 13. The link is also articulated by a second connecting pin 32, at a distance from the first pin 31, on a clevis (not shown) which is secured to the engine casing fitting.

Figure 4:
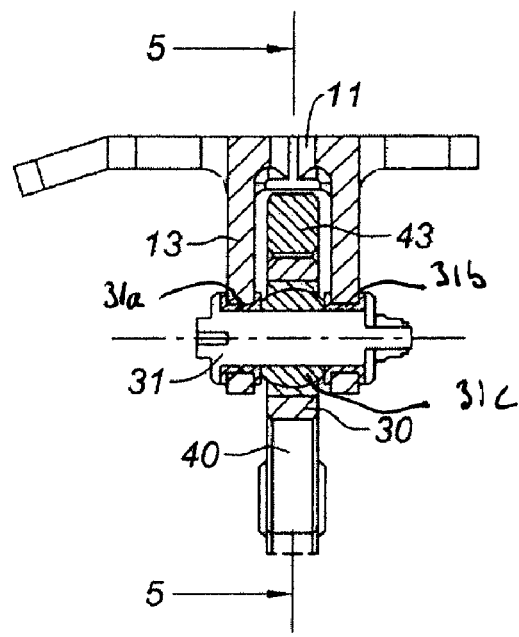
FIG. 4 is a view in section on 4-4 of FIG. 3.

As can be seen from the section in FIG. 4, which is taken in the region of the connection provided by the pin 31, this pin is housed in bores drilled in the two lugs of the clevis 13 and the link 30, by way of bushings 31a, 31b and 31c, respectively. The outer surface of the bushing 31c is spherical. The link 30 is therefore able to pivot not only about the pin 31 but also about any axis which is perpendicular thereto and which passes through the centre of the bushing 31c. This is a swivel-type connection well known per se.

Although only the connection with the pin 31 is illustrated in the figures, the other connections of the links with the pins 21, 41; 22; 32; 42, respectively, are also of the swivel type. These connections are necessary when it is desired for the transmission of the forces to pass through the pin of the links only, and when it is desired for the suspension to be isostatic.

The standby safety connections will now be described.

Figure 5:
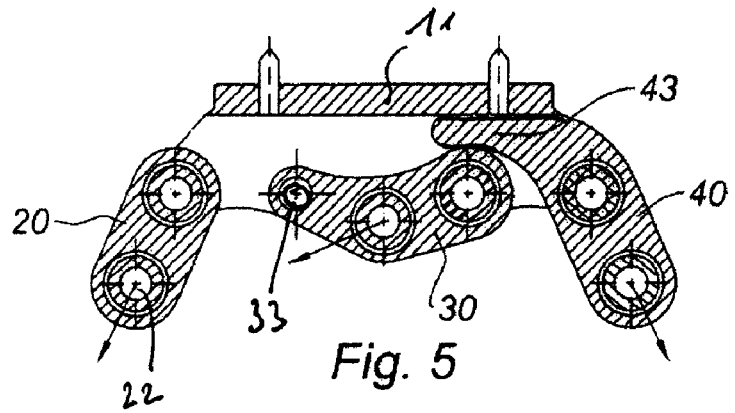
FIG. 5 is a view in section on 5-5 of FIG. 4, and FIGS. 6 to 9 illustrate the operation of the standby safety connections in the various situations of pins being broken.

The second link 40 is prolonged in the region of the first pin 41 by a finger 43 which forms an angle with this link, as can be seen from FIG. 5. This finger 43 comprises a portion which is housed between the end of the central link 30, in the region of its first pin 31, and the platform 11. FIG. 4 also shows the position of the finger 43 portion in normal operation. A first clearance is provided between the head of the central link and the finger. A second clearance is provided between the finger and the platform. In normal operation during all the operating phases of the engine, these clearances are preserved. The shape of the finger and the shape of the link head make it possible for their relative angular positioning to vary within the course of normal operation without these clearances being eliminated.

A second standby safety connection is provided by the connection between the central link 30 and a standby safety pin 33. This pin 33 passes through the lugs of the clevis 15 and through an arm of the central link 30. This arm is situated in the region of the second connecting pin of the central link. The link 30 thus has an approximate V shape, as can be seen from the figure. Unlike the other pins, no force is transmitted by this pin 33 in normal operation, by virtue of a clearance which is provided between the pin and either one of the central link 30 and the clevis 15.

The operation of the safety connections is shown with reference to FIGS. 6 to 9. The defective part is indicated by a cross.

Figure 6:
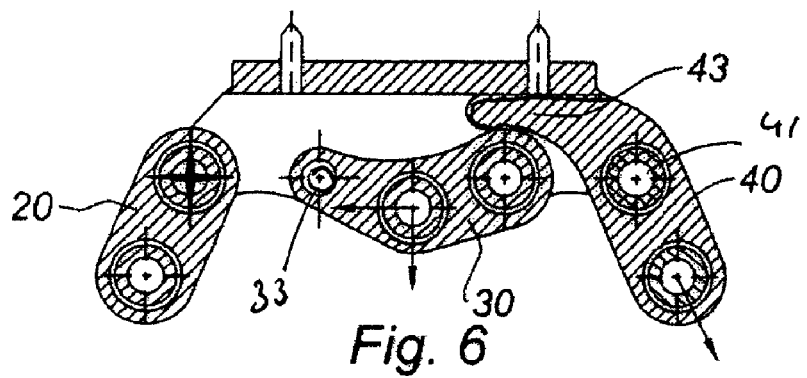

FIG. 6 illustrates the scenario where the transmission of the forces by the first lateral link 20 is interrupted. The clearance around the standby pin 33 is then eliminated. The central link 30 forms a rigid connection. Arrows have been used to represent the direction of the components of the forces transmitted by the two active links. The transmission lost by the lateral link is assumed by the central link.

Figure 7:
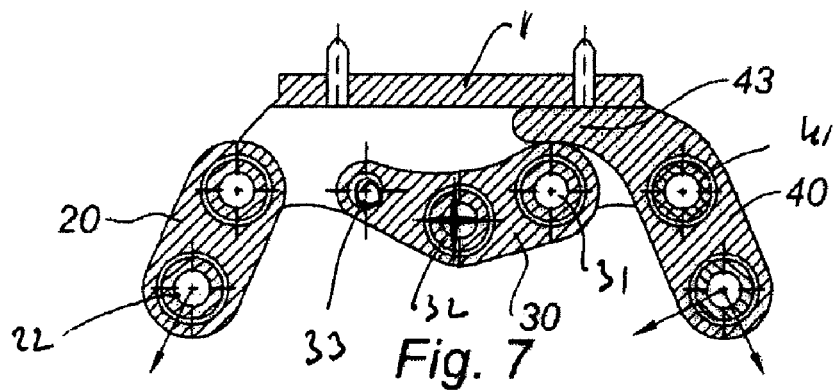

FIG. 7 shows the scenario where the second pin 32 of the central link comes to be broken. The standby connection between the finger 43 and the beam becomes active by eliminating the clearance. The transmission lost by the central link is assumed by the second lateral link 40. The arrows represent the direction of the components of the forces transmitted by the two active links.

Figure 8:
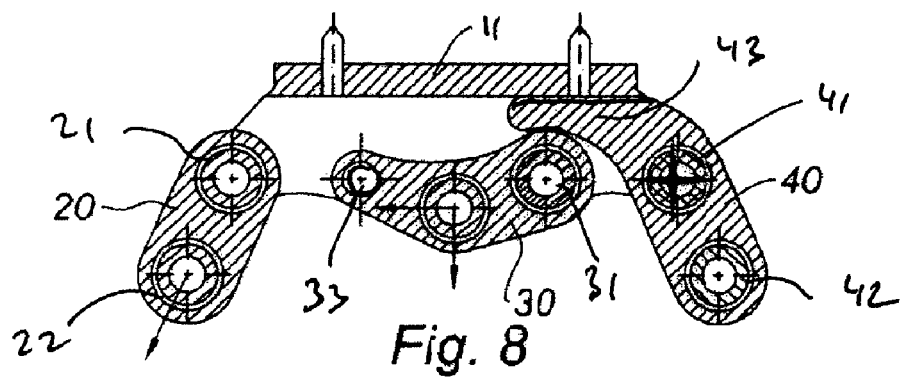

FIG. 8 shows the scenario where the transmission by the second lateral link 40 is lost. The clearance of the second standby connection 33 around the central link 30 is eliminated. This connection becomes active. The forces on the connections are taken up by the central link.

Figure 9:
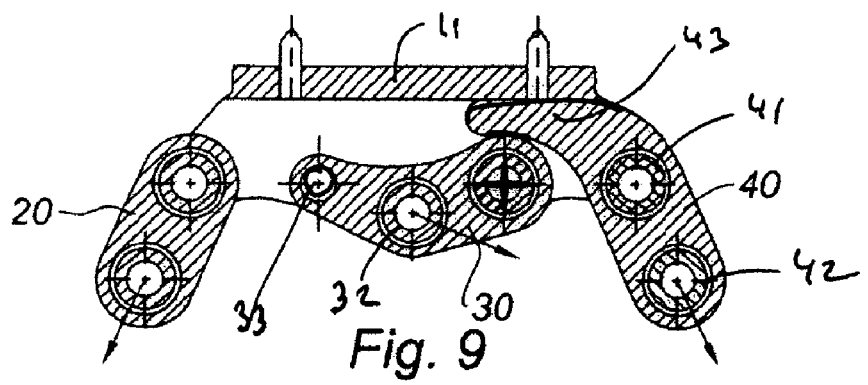

FIG. 9 shows the scenario where the central link 30 breaks on the beam side. The clearance of the second standby connection 33 is eliminated. This connection becomes active.

We claim:

1. A suspension for suspending a jet engine on an aircraft strut, comprising:
    a beam having a platform provided with fasteners for fastening the beam to said aircraft strut and arranged transversely with respect to a longitudinal axis of the jet engine,
    first and second lateral links each connected by a first pin to the beam and by a second pin to an engine casing, the second lateral link being prolonged by a finger extending from the first pin of said second lateral link and housed with clearance in a cavity provided in the beam so as to form a standby safety connection and
    a central link arranged between the first and second lateral links and connected by a first pin to the beam and by a second pin to said engine casing,
    wherein the beam comprises a clevis for housing the first connecting pin of the central link, and said first pin of the central link is distant from the platform so that a space is provided between the platform and the central link, this space forming said cavity in which the finger of the second lateral link is housed with clearance in normal operation such that said finger, in said normal operation, extends between said platform and said first pin of the central link and across a plane passing through said first pin of the central link and perpendicular to the platform, and
    wherein said clearance is eliminated when the transmission of the forces by the second pin of the central link is interrupted.

2. A suspension according to claim 1, wherein the central link is connected by a third pin to the beam so as to form a second standby connection with a clearance.

3. A suspension according to claim 2, wherein the clearance of the second standby connection is eliminated when the transmission of the forces by the first lateral link or the second lateral link is interrupted.

4. A suspension according to claim 2, wherein the clearance of the second standby connection is eliminated when the transmission of the forces by the first pin of the central link is interrupted.

5. A suspension according to claim 1, wherein the clevis supports the first connecting pins of the two lateral links and of the central link together to form a piece of a U-shaped cross section with the platform.

6. A suspension according to claim 1, wherein the connections of the links with the beam or the casing are swivel-type connections.

7. A suspension according to claim 1, wherein said clevis has upstream lugs and downstream lugs relative to a gas-flow direction in said jet engine, wherein said upstream and downstream lugs house the first connecting pins of the first and second lateral links and of the central link, and wherein said upstream lugs are in a plane perpendicular to a plane of said platform, and said downstream lugs are in a plane parallel to the plane of the upstream lugs.

8. A suspension according to claim 1, wherein said finger forms an angle with a portion of said second lateral link extending between the first and second pins of the second lateral link.

9. A suspension according to claim 8, wherein said clearance, during said normal operation, includes a first clearance between said central link and said finger and a second clearance between said finger and said platform.

10. A suspension according to claim 9, wherein said finger and said central link are configured such that a relative angular position between said finger and said central link is variable during said normal operation without eliminating said first and second clearances.

11. A suspension according to claim 1, wherein said first connecting pins of the first and second lateral links and of the central link are arranged on a same plane parallel to a plane of said platform.

12. A suspension according to claim 1, wherein said central link is connected by a third pin to the beam, and wherein said first connecting pins of the first and second lateral links and of the central link and said third pin are arranged on a same plane parallel to a plane of said platform.

\* \* \* \* \*